United States Patent [19]
Gardner et al.

[11] Patent Number: 5,758,327
[45] Date of Patent: May 26, 1998

[54] ELECTRONIC REQUISITION AND AUTHORIZATION PROCESS

[75] Inventors: Ben D. Gardner, 1681 Hanchett Ave., San Jose, Calif. 95128; Wilbert S. Folds, San Mateo; Nora L. Roberto, Livermore, both of Calif.

[73] Assignees: Ben D. Gardner, San Jose; Nora Roberto, Pleasanton, both of Calif.

[21] Appl. No.: 551,434

[22] Filed: Nov. 1, 1995

[51] Int. Cl.⁶ .................................................. G06F 17/60
[52] U.S. Cl. .................................................. 705/26
[58] Field of Search ........................... 395/226, 227, 395/50, 207, 210, 211, 235; 705/26, 27, 7, 10, 11, 35; 340/825.3, 825.34, 825.35; 235/375, 380, 381, 383

[56] References Cited

U.S. PATENT DOCUMENTS

| | | | |
|---|---|---|---|
| 4,799,156 | 1/1989 | Shavit et al. | 705/37 |
| 4,947,028 | 8/1990 | Gorog | 705/40 |
| 5,021,953 | 6/1991 | Webber et al. | 705/5 |
| 5,319,542 | 6/1994 | King, Jr. et al. | 705/26 |
| 5,666,493 | 9/1997 | Wojcik et al. | 705/26 |

OTHER PUBLICATIONS

Phillip Zimmermann, Pretty Good Privacy Public Key Encryption for the Masses, Phil's Pretty Good Software, Oct. 11, 1994.

Primary Examiner—Edward R. Cosimano
Assistant Examiner—Junghoon Kenneth Oh
Attorney, Agent, or Firm—Terry McHugh

[57] ABSTRACT

A method of electronic requisition processing includes storing company-specific requisition rules and an electronic catalog on a central computer system located at a first site. The central computer system is linked to a number of companies by means of an external communications line, such as a telephone system-and-modem arrangement. A requester at one of the companies may identify one or more items to be ordered. In response to the requisition, the company with which the requestor is associated is determined, and the appropriate requisition rules for that company are implemented. If more than one item is identified, a requisition folder is formed in software to contain a number of requisitions. Also contained in the requisition folder are any required attachments, with each attachment being designated as being "internal" or "external" and as "confidential" or "non-confidential." The authorization process dictated by the requisition rules of the company are followed, with at least a portion of the process being executed electronically via the external communications line. If the purchase of items is authorized, an appropriate number of purchase orders are generated and are preferably transmitted to vendors electronically. The method isolates the companies from the vendors. In one embodiment, the payment process is also carried out in a manner that isolates the companies and the vendors. Vendors invoice the operators of the central computer system, who then invoice the companies.

14 Claims, 3 Drawing Sheets

ELECTRONIC REQUISITION AND AUTHORIZATION PROCESS

TECHNICAL FIELD

The invention relates generally to methods of processing requisitions of items for individuals of a business entity and more particularly to methods of facilitating electronic commerce for a number of companies.

BACKGROUND ART

Within a particular business, there are typically established requisition rules regarding the procedure to be followed in the procurement of goods and services, e.g., computer equipment. Relatively large corporations are most likely to establish requisition rules that must be followed before the purchase of goods and services. Requisition rules will vary from company to company, depending upon a number of factors, but the steps within the process will be generalized in order to facilitate the below description of the typical requirements of the procedure.

In a first step, the individual within the business entity (hereinafter referred to as a "company") identifies a need. There may be a specific requisition form that must be completed. In addition to identification of the goods or service, there may be requirements such as evidence that bids were submitted by a number of vendors of the requested goods or services.

An authorization step requires designated individuals to approve the purchase of the goods or services. Within the requisition rules, the designated individuals may be identified in what is referred to as an "authorization matrix." The authorization matrix may identify a single person, e.g., a finance manager, or a number of individuals. The authorization matrix for two independent companies is not likely to be the same.

If the requisition is approved, a purchase order is generated. The purchase order is sent to a vendor of the requested goods or services. The vendor then supplies the requested item, i.e., goods or services. Payment may be sent with the purchase order, but is typically sent in response to an invoice generated by the vendor for delivery with the item.

U.S. Pat. No. 5,319,542 to King, Jr. et al. discloses a procurement system that includes electronic processing. The system may be accessed by both the suppliers of goods or services and the customers. The system comprises two major components: (1) the electronic catalogs and (2) the electronic requisition. Each supplier has control over a dedicated portion of a public database. Consequently, each supplier may determine the content of the material of that portion of the database. The resulting public catalog permits multiple customers to access and identify descriptions of products from a variety of suppliers. A customer access/download control function permits the various customers to control access to and downloading of supplier-maintained catalog data, so that the individual suppliers can control the availability to product and pricing information. In addition to the public catalog, private catalogs can be maintained through the cooperation of the customers and the various suppliers. The private catalog functions allow customers to load, access and identify supplier products on the local computer systems of the customers.

The other major component of the procurement system disclosed in King, Jr. et al. is the electronic requisition process. This process automates the traditional approach of manually generating and transmitting requisitions. Optionally, the approval process may also be carried out electronically, with each customer site being able to customize automatic routing tables to control requisition routing. When a requisition receives proper approval, a purchase order is electronically sent directly to the appropriate supplier.

Thus, King, Jr. et al. teaches that the procurement system can be improved by adding a "passive" site for access by suppliers and purchasers. The individual suppliers determine the content of the public catalog. The purchasers are allowed to load private catalogs onto their local computer systems. The customers can also customize automatic routing tables to control requisition processing. Then, the orders are transmitted directly from the customers to the suppliers. While the disclosed procurement system provides a number of improvements over the conventional hard copy method of ordering items from suppliers, the passive method includes a number of limitations. Firstly, by allowing the different suppliers to independently maintain separate catalogs of products and services, it may be difficult and/or time-consuming to comparatively shop. Another concern is that the system does not address handling of various required aspects of requisition rules of companies. For example, there may be a requirement that a requisition include evidence that the desired equipment was submitted for bid. Moreover, the patent does not address the complexity of generating and processing requisitions for a large number of items for a single project.

Another issue regarding the procurement system of King, Jr. et al. is security. The patent notes that all information is contained on a "public database." Both the suppliers and the customers are allowed not only to access the information, but also to customize the information. While security measures for protection of computer-stored information has improved with time, the concern that customers will avail themselves to secured information of other customers or will improperly modify data on the public database exists.

Yet another concern is that use of the procurement system may be limited to customers having specific hardware and software. The patent notes that the public database uses an IBM 3090 mainframe (IBM is a registered trademark of International Business Machines Corporation). The public database operates on the MVS operating system. It is also noted that the customer operating environment includes a mainframe computer such as the IBM 3090 or AS/400 (AS/400 is a trademark of International Business Machines Corporation) with attached personal computer workstations. Communications between the computer systems are preferably accomplished using industry standards such as American National Standard Institute X24.

What is needed is a method of electronic requisition and purchase order processing that overcomes some of the limitations of conventional strategies.

SUMMARY OF THE INVENTION

A method of electronic processing includes storing company-specific requisition rules of a number of independent companies within a computer system located at a first site and includes satisfying the appropriate requisition rules, such as provision of attachments, via communications with company computers remote from the first site. In addition to storing requisition rules, the central computer system includes a catalog of "items," i.e., goods and/or services. Preferably, the catalog includes items from a wide variety of vendors. An individual requester, such as an employee of one of the independent companies, electronically generates a requisition form by identifying one or more of the items from the catalog or identifying items not found in the catalog.

In the preferred embodiment, if the individual requestor identifies more than one item in a single requisition, the identification of the items remains substantially intact during a process dictated by the appropriate company-specific requisition rules. Then, upon approval of the items, more than one purchase order may be generated. As an example, if five items are identified, the computer system at the first site may form a single computer folder having sub-requisitions. The number of sub-requisitions may correspond to the number of identified items in the requisition. Alternatively, the number of sub-requisitions may be determined by other factors, such as whether the items are catalog or non-catalog items, the number of vendors from whom the items will be ordered, and/or the expense types of the items.

As previously noted, requisition rules may require attachments. Within the inventive method, required documents are attached in software to the requisition. Attachments can be any of a variety of forms. Hard copies of bids may be scanned into a computer folder having the required requisition form. Preferably, multimedia attachments may be utilized. For example, a portion of a teleconference discussing the company's need for the item may be attached to the requisition. Each attachment is designated as being for access within the company, i.e., an "internal attachment," or for access by a vendor, i.e., an "external attachment." There is also an optional designation, if the attachment is to be viewed only by specific individuals, i.e. a "confidential attachment."

The appropriate company-specific requisition rules are selected according to the affiliation of the requestor with one of the companies. The requisition rules include an authorization matrix. The authorization matrix dictates the individuals within the company that must sign in order to provide proper approval of the requisition. The requisition file and its attachments are routed through the authorization process according to a routing engine that identifies the person-to-person sequence. The requisition rules may include information related to delegation of the required authorization signature and may include designation of agents for delegating signatures.

The authorization process preferably takes place exclusively via computers and modem communications. The authorizing signatures may be digital signatures.

If the requisition file includes more than one requested item for purchase, there may be line vetoes of some items and line approvals of other items. Files having line vetoes are preferably redirected to the requestor, who can then reconsider the purchase of the remaining items.

After the approval process has been completed, purchase orders are generated. The number of purchase orders may be determined by the same factors regarding generating sub-requisitions within the requisition file. In the simplest form, the number of purchase orders is equal to the number of items ordered. In the preferred embodiment, the purchase orders are generated in software and are transmitted to vendors electronically. Electronic file transfer or e-mail may be utilized.

Upon receiving a purchase order, the vendor proceeds to fill the order. For example, the vendor may transfer the ordered item to a distribution provider which delivers the item to the company. While not critical, the invoice is preferably processed through the computer system at the first site. That is, the invoice is transmitted to the operator of the requisition processing system. The invoice from the vendor is matched with a proof-of-delivery (POD) from the distribution provider. Payment is then approved and the appropriate dollar value is sent to the vendor. Payment by the company is made to the operator of the processing system.

The method may be used to isolate the company and requester from the vendors. The processing system receives and then routes the requisition. The processing system also generates the purchase order and transmits it to the vendor. Delivery may be made through the distribution provider. Invoicing is carried out through the processing system.

An advantage of the invention is that the requisition processing is implemented with a minimum emphasis on paper handling. The overall strategy is to utilize electronic commerce. Ideally, the communication with the vendor and the distribution provider is performed electronically. Thus, another advantage is that the original requestor of an item may be provided with access to the requisition process, allowing the requester to track the progress of the requisition and purchasing process.

Another advantage is that if the operator of the processing system is responsible for payment, servicing a number of companies may provide each company with leverage with regard to volume discounts. Yet another advantage is that the processing system may be configured to be accessed by any of a variety of operating systems.

BEST MODE FOR CARRYING OUT THE INVENTION

Figure 1:
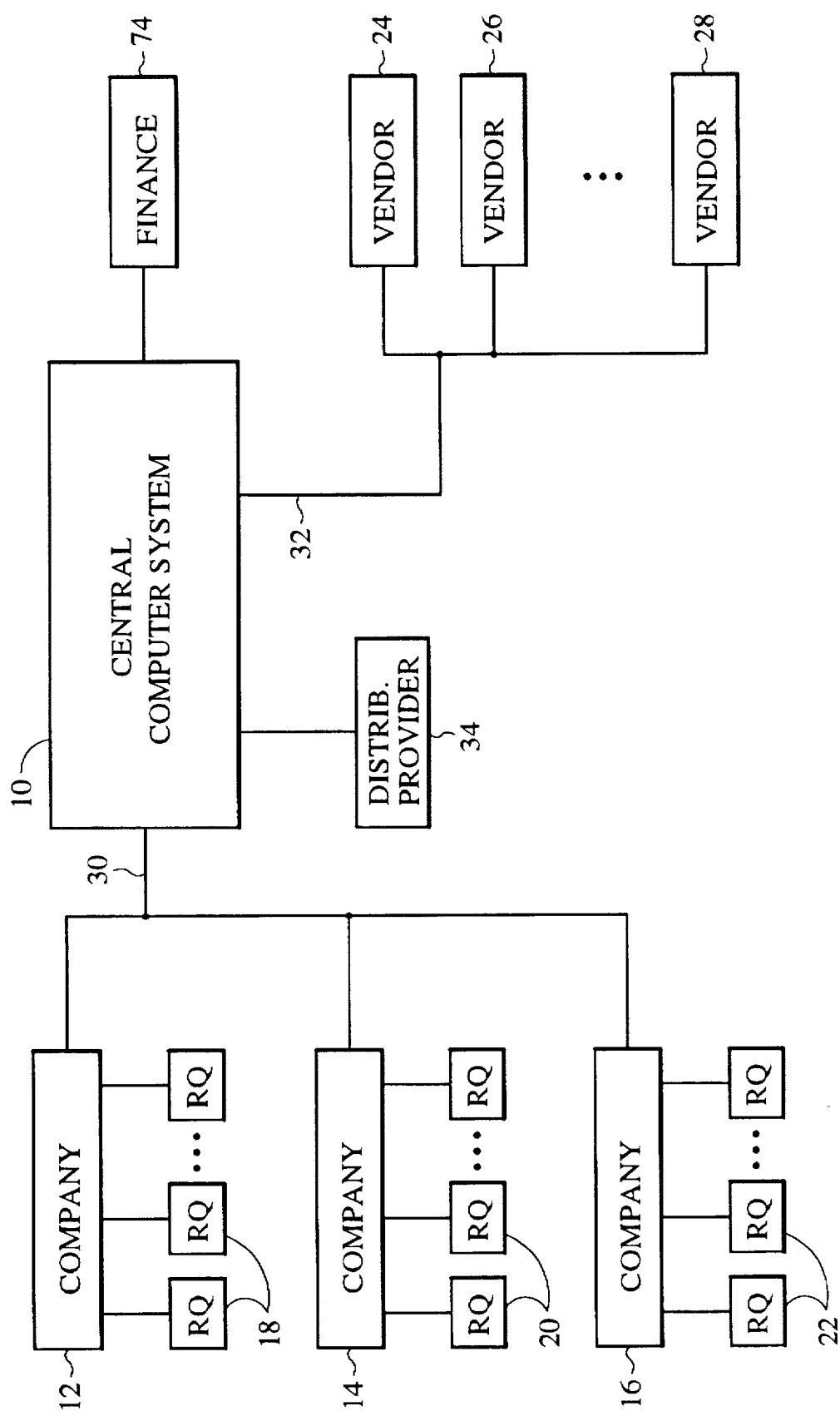
FIG. 1 is a block diagram showing the relationship of entities involved in the electronic requisition and purchasing process in accordance with the invention.
Figure 2:
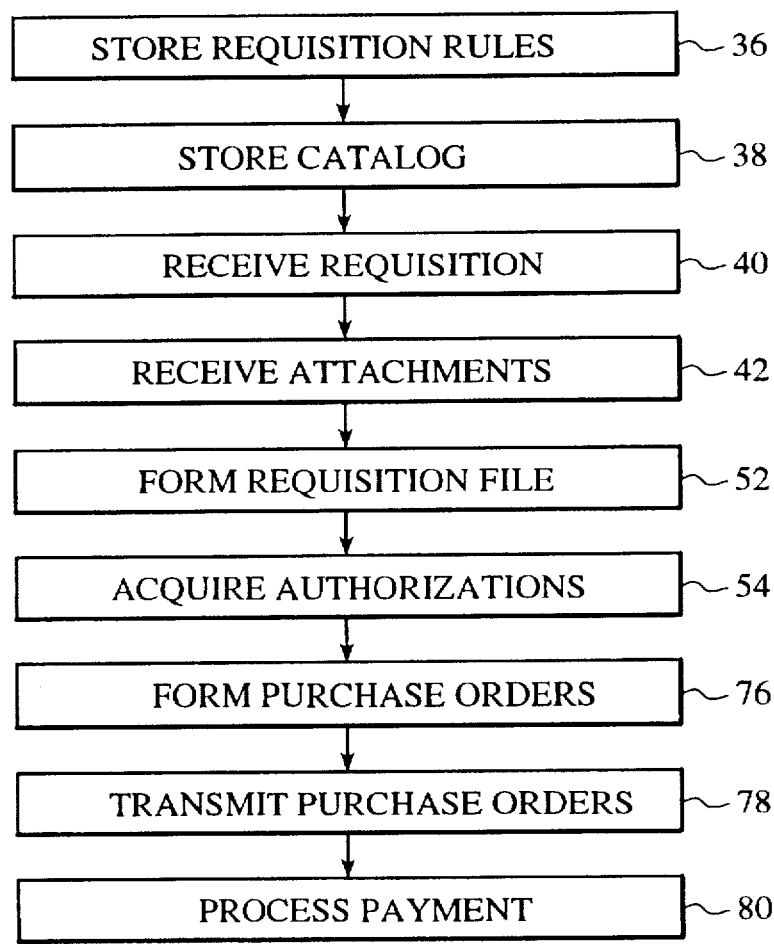
FIG. 2 is an operational view of an electronic requisition and payment processing system in accordance with the invention.

With reference to FIGS. 1 and 2, a central computer system 10 is connected to a number of independent companies 12, 14 and 16. Each company is a business entity, such as a corporation or partnership. Within each company are potential requestors 18, 20 and 22. The requesters may be principals or employees of the individual companies.

The connection of the system 10 to the companies 12, 14 and 16 is by means of an external communication line 30. In its least complex embodiment, the communication line comprises modems and telephone lines. However, more complex embodiments are contemplated. For example, ISDN lines, Internet, Worldwide Web or other equipment and modes of communication may be utilized. Each requester may have a separate facility, e.g., desk-top computer, or a company may have a dedicated site for communication to and from the central computer system 10.

The central computer system 10 is also linked to vendors 24, 26 and 28 that supply items, such as computer equipment, or components for loading printed circuit boards, or services. The vendors 24-26 are shown as having an external communication line 32 to the central computer system 10. This is clearly the preferred embodiment, but the procurement system to be described below may be used in embodiments in which communications with the vendors includes direct human contact.

The following describes a centralized model. However, this process could be executed using a distributed model wherein the routing engine, authorization rules and attachments exist within the individual companies 12, 14 and 16.

The central computer system 10 is also connected to a distribution provider 34. The distribution provider is an optional entity that is used to deliver items from the vendors 24, 26 and 28 to the companies 12, 14 and 16. The distribution provider is not critical to the procurement system.

In a first step 36 of FIG. 2, the requisition rules of each company 12, 14 and 16 are stored at the central computer system 10. There are a number of different components of the requisition rules. For example, the requisition rules of company 12 may include an authorization matrix that dictates persons who must approve a requisition, a routing engine that dictates the person-to-person sequence within the authorization process, and requirements related to bids. Other aspects of the requisition rules will be described below.

A second step 38 is to store a catalog. The order of steps 36 and 38 may be reversed or carried out simultaneously. The catalog is stored as an electronic catalog and includes all information regarding approved products and services that are available to the companies 12, 14 and 16. These items may be pre-negotiated with the vendors 24, 26 and 28, so that cost savings are reflected in the stored prices. The electronic catalog is dynamic and facilitates the purchase of products and services in an automated fashion. That is, because the catalog items are pre-approved and pre-negotiated, once an item is requested and internally approved by the appropriate managers within the company organization, the item or items can be directly communicated to the appropriate vendor to fill the order, without the need for involvement in the transaction by a buyer that is associated with the procurement system and the central computer system 10. The goal is to handle the majority of customer transactions via the catalog model, thereby capitalizing on previously negotiated contracts and eliminating non-value-added activities.

In the preferred embodiment, the step 38 of storing a catalog includes forming a single catalog that includes products and services of all of the vendors 24, 26 and 28. Thus, a single view of available information is presented to the requesters 18, 20 and 22. This is in contrast to a public database of catalog information in which information is segregated according to vendors. As a result, there are advantages to the requesters in terms of viewing the information. From the viewpoint of a vendor, products and services may be available to a larger audience of potential customers. If the volume of transactions with a particular vendor is sufficient, the operators of the central computer system 10 will have increased negotiating leverage in securing a favorable price for future transactions.

In addition to identifying items and the costs of the items, the storing of the catalog may include storing commodity code structures and charts of accounts for the companies 12, 14 and 16 for transactions with the vendors 24, 26 and 28.

The next step 40 in FIG. 2 is one in which an individual requestor 18 of FIG. 1 identifies one or more products or services. The item or items may be from the stored catalog or may be non-cataloged items.

In operation, one of the requesters 18 of company 12 may browse the electronic catalog to determine whether a specific item is available. In addition to the general catalog, there may be a company-specific catalog available to the requesters 18 of company 12. The company-specific catalog may include items not available to the other companies 14 and 16 or may include discount and other pricing information different than the other companies. If the item is found by the requestor 18, a requisition form is completed by the requester. The requisition form may be stored at the central computer system 10 as part of the requisition rules 36 of the company. In addition to the identification of the item or items, the requisition form will include blocks regarding the identification of the company, any commodity code, any account code, etc.

The requestor-to-system interface preferably allows any requester to initiate an ordering process from a desktop computer, regardless of the computer platform used by the requester. That is, the interface is transparent to operating systems and to company computer networks. One possibility is for access to the central computer system 10 to be by means of a worldwide web (WWW) homepage. One important benefit to such an ordering process is that it allows a requestor to track progress of requisitions all the way to the point of delivery. Computer system 10, however, allows tracking through to the point of payment. The process to be described below provides up-to-the-minute information as to the status of a request.

Depending upon the requisition rules of the particular company 12 and depending upon other considerations, there may be attachments to the requisition form. Step 42 in FIG. 2 is a step in which attachments are received at the location of the central computer system 10. The attachments may be sent electronically, such as by electronic mail. Hard copy attachments may be sent electronically by facsimile or by means of the postal service.

Figure 3:
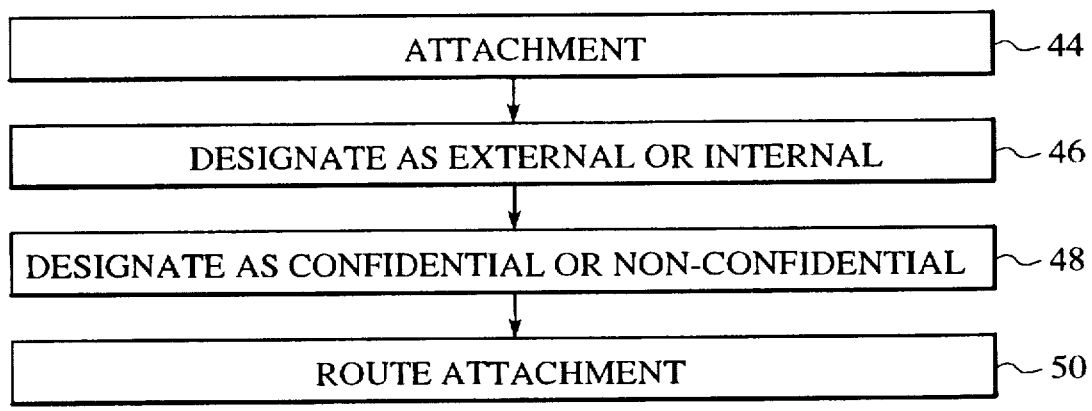
FIG. 3 is an operational view of an attachment process for the method of FIG. 2.

Referring now to FIG. 3, the received attachment 44 is designated as being an "external attachment" or an "internal attachment." An external attachment is one for access by a vendor, while an internal attachment is used within the company 12 with which the requestor 18 is associated. An example of an internal attachment is a copy of a budget of a project. An example of an external attachment is a GIF file of a catalog page containing the requested item, where the requested item is not contained within the electronic catalog stored at the central computer 10.

In step 46 of FIG. 3, the attachment 44 is designated as being external or internal. Any means of designating may be utilized. An Internet interface may have separate representations of buttons that allow a requestor to toggle the internal designation or external designation. Alternatively, the particular attachment may be designated as being both for internal and external use. The attachment is systematically encoded, so that it is accessible only at the appropriate sites.

The attachment 44 is also designated as being either a "non-confidential attachment" or a "confidential attachment," as shown at step 48 in FIG. 3. For an internal attachment, the designation of "non-confidential" will allow all persons within the approval process to have access to the attachment. On the other hand, a designation of the attachment as being "confidential," allows the requestor to identify only certain individuals as having access to the attachment. The designation of the attachment as being "non-confidential" is the default designation, but this is not critical.

In step 50, the attachment is routed. Typically, the attachment is transmitted with the requisition to each person in an approval process. Alternatively, the private attachment is transmitted only to the designated individuals.

The attachments may be text files, a video file, an audio file, or a multimedia file. An example of a multimedia file is the voice and video information of a recorded video conference in which the topic of conversation was the requested item. If the attachment is not initially in an electronic format, the operators of the central computer system 10 provide a mechanism to convert the attachment into an electronic equivalent. For example, a hard copy bid may be scanned into the central computer system. While the requisition is preferably transparent to a computer format, attachments may be platform-specific.

Returning to FIGS. 1 and 2, the next step 52 is to form a requisition file. The requisition file is formed in software and contains the requisition form and any attachments. In the preferred embodiment, if the requestor 18 identifies a number of items in a single session, the identification of the items remains intact during the authorization process. In one implementation, the requisition file includes a number of sub-requisitions. The number of sub-requisitions may be determined by any of a variety of factors, including the total number of items requested, the number of potential vendors, the expense types of the items, and whether each item is stored in the electronic catalog or is a non-catalog item. If a number of items are requested, each attachment is designated as being relevant to the appropriate item or items. Preferably, the requisition file is a single folder in order to facilitate ease of transmission. Upon reaching a designation, the folder is opened to reveal its contents. Purchase of certain items can be approved, while purchase can be denied for other items. However, the folder preferably remains intact.

In step 54, the authorization process is initiated. This process is dictated by the requisition rules stored during step 36. The goal of the authorization step 54 is to provide an environment that is secure, accurate and efficient. As previously noted, the requestor 18 of the item or items preferably has access to the status of the request at any time, particularly as the request is moving through the authorization cycle. The decision-makers who are authorized to approve the request are able to review the requisition, its supporting attachments, and the status of persons who have previously approved versus persons who have not yet approved the request.

Typically, the authorization process takes place in serial form. That is, the requisition folder that is formed at step 52 is transmitted from one person to the next person. However, the requisition rules of a particular company may allow parallel processing in order to increase speed.

Figure 4:
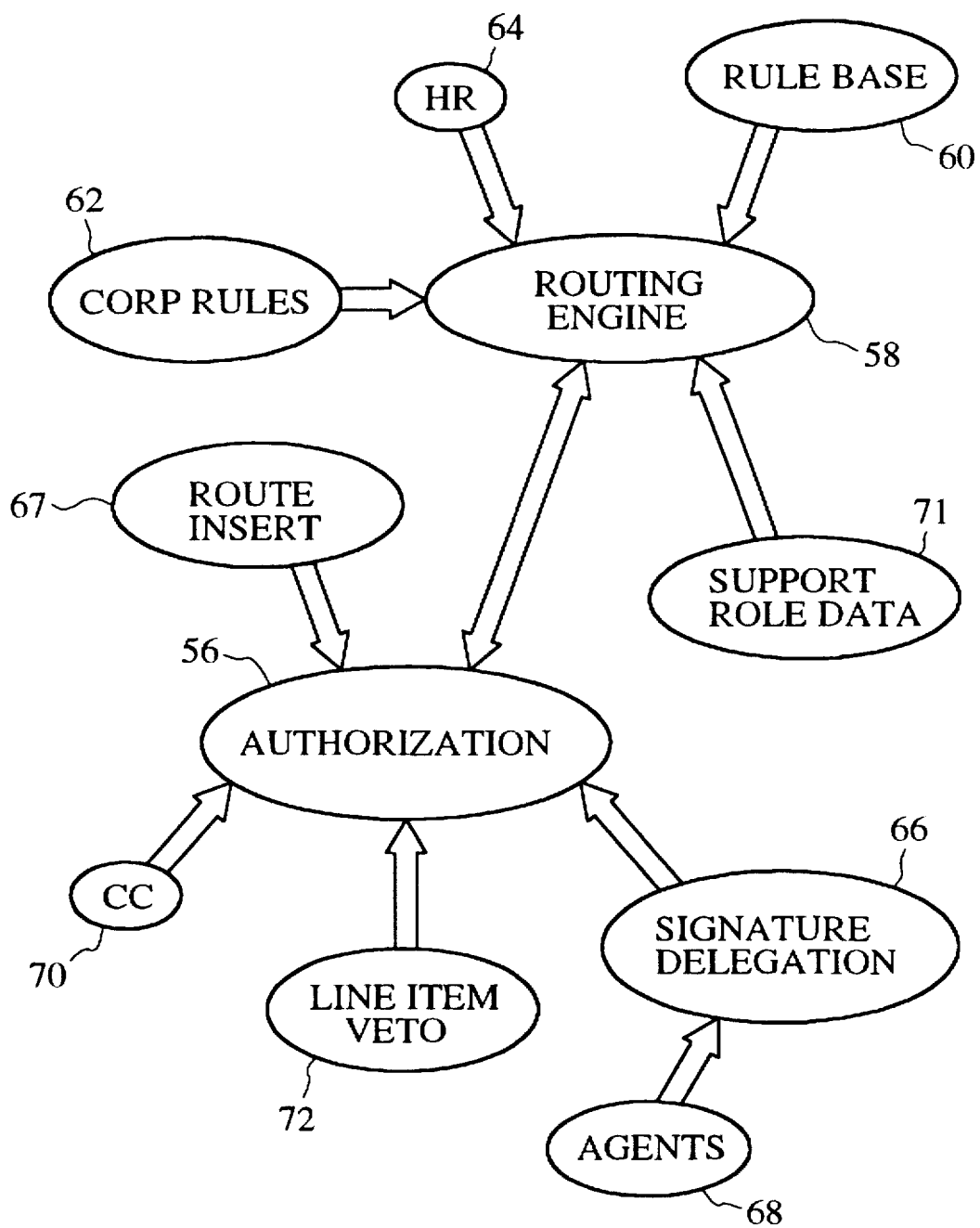
FIG. 4 is a schematic representation of inputs to an authorization process of the method of FIG. 2.

Referring now to FIG. 4, there are a number of inputs to the authorization process, shown schematically by reference numeral 56. Perhaps the most important input is an exchange with a routing engine 58 that is dictated by the requisition rules of the appropriate company. The routing engine may be somewhat variable within the particular company. For example, a rule base 60 may designate a particular sequence or required signature level for one division or department of a corporation, while a second division or department may have a separate sequence or required signature level. Of course, the routing engine may vary from one country to another country for an international corporation. In addition to the rule base, there may be particular corporate rules 62 that will vary the routing engine depending upon the requested items. That is, the rule base 60 determines variations based upon the requester, while the corporate rules 62 vary the routing engine according to the requested items. The sequence may be varied by the corporate rules 62 according to whether the item is capital versus expense.

The routing engine 58 also receives an input from Human Resources 64 of the company. Thus, if there has been a promotion, demotion or departure of a particular individual, the routing engine is "informed," so that the routing continuously computes the route based on newest information.

The authorization process 56 has an input related to signature delegation 66 and an input for support role data 71. If an individual designated by the routing engine 58 leaves for a vacation, that individual may delegate approval to an available individual. Alternatively, delegation may be automatically inferred for items less than a specific dollar value or for specific commodities, i.e. dollar-specific delegation or commodity-based delegation. The input from area 66 may be a delegation history, a simple delegation to a valid employee, or may be based upon a limited time.

An input to the signature delegation 66 is agent data 68. There may be designated persons who can act as agents for designating signatures. For example, if a person who is required to approve a particular requisition is unavailable for an extended period of time and has not delegated signature responsibility, the input from 68 may provide information as to an agent who can delegate the signature of the unavailable person.

A route insert 67 provides the ability to insert an individual in the approval route, either before or after an approver. This allows for additional review by impacted parties.

A "CC" input 70 establishes automatic transmission of copies of the requisition to individuals identified on a courtesy copy list. The list may be determined by the requestor or by corporate rules.

An input 72 allows a line item veto of some of the items of a requisition folder having more than one requested item. Thus, the multi-item requisition folder can progress through the authorization process 56 even though purchase of some of the requested items has been disapproved. The folder is then directed to the requestor to allow the requester to reconsider whether the approved items should be purchased.

Returning to FIG. 1, communications during the authorization process take place primarily via the external communications line 30. Electronic mail may be used to transmit the requisition folder from one person identified in the authorization matrix to the next person. Electronic file transfer (EFT) and electronic data interchange (EDI) are well known in the art. However, some of the communications may be by other modes, e.g., facsimile transmission.

Approval by persons identified in the authorization matrix may be provided by digital signatures. Recognition of digital signatures increases the speed of the process.

As previously noted, the requester has the ability to track the progress of the requisition. The requester tracking engine may be automatic, so that the requester receives a copy of the requisition folder as each step is completed. Alternatively, the tracking engine may be one that requires the requester to initiate a status inquiry.

At times, there may be a corporate rule or other requisition rule that requires an input from a financial entity, such as a bank or an investment house. In FIG. 1, the central computer system 10 is shown as having a link to such an entity 74. While not critical, the communications between the financial entity and the operators of the central computer system preferably include electronic transmissions.

Referring to FIGS. 1 and 2, if approval is received during the authorization process at step 54, an appropriate number of purchase orders is formed at step 76. In operation, an approved request can migrate into a company-specific business application server or can become part of the service of the central computer system 10. If the purchasing is to take place by means of the central computer system, the determination of the appropriate number of purchase orders may be made using the same factors described above with reference to the number of sub-requisitions within a requisition folder. Thus, there may be a separate purchase order for each requested item, or the number may be based upon other factors, including the number of vendors from whom items are to be ordered, the expense types of the items, and whether each item is taken from the stored electronic catalog or is a non-catalog item.

For requisitions involving only catalog items, the step 76 of forming purchase orders may be an automatic process. On the other hand, non-catalog requisitions will typically require involvement by a buyer who locates a vendor of the item or items and who may negotiate prices.

In step 78, the purchase orders are transmitted to the vendors 24, 26 and 28 via the external communication line 32. The transmission is independent of the companies 12, 14 and 16. For a catalog item, the purchase order is electronically transmitted to the vendor. The transmission may be an EDI. In some instances, the purchase order may need to be mailed or sent via facsimile to the appropriate vendor.

The distribution provider 34 is an optional entity for delivering items from the vendors 24, 26 and 28 to the companies 12, 14 and 16. The step 80 of processing payment preferably takes place at the location of the central computer system 10, rather than at the individual companies.

The distribution provider 34 delivers the item or items to the appropriate company 12, 14 and 16 and transmits an electronic proof of delivery (EPOD) to the central computer system 10. Rather than invoicing the company, the vendor 24, 26 or 28 may transmit an invoice to the operators of the central computer system by means of an EDI. The invoice from the vendor is matched with the EPOD. If the information matches, an invoice is generated at the central computer system and electronically transmitted to the company. By providing direct communication with the distribution provider 34, the original requestor 18, 20 or 22 and/or the company 12, 14 or 16 with whom the original requester is associated may determine the delivery status. If the requested item has been delivered, the EPOD will be available. If the item is shown as being en route, a re-query may be automatically made based upon selected system parameters, e.g., time-based re-query of twenty-four hours. A query will also indicate whether the item is back ordered.

While the preferred embodiment of the invention exercises the various steps of FIG. 2 electronically, there may be a combination of electronic transmission and other forms of transfer. For example, in the step 54 of acquiring authorizations, the requisition folder may be electronically transmitted to the appropriate company, but then be hand-carried from one approver to the next approver.

We claim:

1. A method of electronic requisition processing comprising steps of:

electronically storing company-specific requisition rules of a plurality of companies within a computer system located at a first site, said company-specific requisition rules including authorization procedures for obtaining company purchase-authorization, wherein said computer system is connected to an external communications line to receive data from computers remote from said first site;

electronically receiving, via said external communications line, a requisition that identifies more than one item to be ordered, including receiving said requisition from a requestor associated with one of said companies and from an external site remote from said first site;

determining with which company said requestor is associated;

in response to said step of determining said company, recognizing appropriate requisition rules for processing said requisition;

while maintaining identification of said more than one item substantially intact, following a process dictated by said appropriate requisition rules, wherein at least a portion of said process is executed electronically via said external communications line;

following said authorization procedure for obtaining company purchase-authorization for said more than one item; and if, in response to following said process, company purchase-authorization is provided for purchasing at least one of said items, generating an appropriate number of purchase orders, wherein said appropriate number is determined by preselected factors.

2. The method of claim 1 wherein said step of generating an appropriate number of purchase orders is a step of generating purchase orders equal in number to the number of items for which authorization was provided.

3. The method of claim 1 wherein said step of generating an appropriate number of purchase orders is a step including determining said appropriate number based upon factors that include the number of vendors from whom said items are to be ordered, the expense types of said items and whether each item is in a catalog stored within said computer system at said first site.

4. The method of claim 1 wherein said step of generating an appropriate number of purchase orders includes electronically transmitting each purchase order to a vendor, said method further comprising a step of initiating an electronic payment process sequence for each purchase order.

5. The method of claim 1 wherein said step of following said process dictated by said appropriate requisition rules includes electronically transmitting data both to and from said computer system by means of a computer of said company.

6. The method of claim 5 wherein said step of maintaining said identification of said more than one item intact includes forming a plurality of subrequisitions for items of said requisition and maintaining said subrequisitions in a group when electronically transmitting said data both to and from said computer system.

7. The method of claim 6 wherein forming said subrequisitions is a step of forming a subrequisition for each vendor of a plurality of vendors from whom said items are to be purchased, wherein the number of sub-requisitions is equal to said number of purchase orders to be generated.

8. The method of claim 6 wherein said step of generating said appropriate number of purchase orders is a step of generating an electronic purchase order for each subrequisition for which a purchase is authorized.

9. The method of claim 1 further comprising a step of electronically storing a catalog within said computer system at said first site and storing requisition forms for identifying items from said catalog and for identifying items not included in said catalog, said method further comprising a step of said requestor generating said requisition that identifies said items by means of completing one of said requisition forms.

10. The method of claim 1 wherein said step of following said process dictated by said appropriate requisition rules includes recognizing digital signatures of authorizing persons and includes allowing authorization of purchase of some of said items and refusal of authorization of other items.

11. A method of processing orders by individuals associated with any one of a plurality of companies comprising steps of:

(a) providing a central computer system accessible by each of said companies;

(b) storing on said central computer system data related to availability of items from a plurality of unrelated vendors and storing data related to company-specific authorization procedures for each of said companies;

(c) for an individual associated with a first company of said plurality of companies, accessing said data from a company computer remote from and not local-area networked with said central computer system;

(d) during said step of accessing said data, selecting at least one of said items by designating said item on a requisition form and electronically transmitting said designation from said company computer to said central computer system;

(e) initiating said company-specific authorization procedures of said first company;

(f) acquiring authorization, according to said company-specific authorization procedures, from said company for purchase of each item, including using electronic transmissions to and from said central computer system;

(g) upon receiving said authorization from said company, electronically transmitting a purchase order to one of said vendors for purchase of said item; and (h) during each of steps (e) and (g), allowing said individual to access information on said central computer system relating to processing of said requisition.

12. The method of claim 11 further comprising steps of electronically transmitting an electronic proof of purchase from said vendor to said central computer system upon initiating delivery of said item and allowing said individual access to information relating to said electronic proof of purchase.

13. The method of claim 11 wherein said step of acquiring authorization includes electronically routing said requisition according to an authorization matrix established by said company.

14. The method of claim 13 further comprising executing an electronic payment process for payment of said item.

* * * * *